United States Patent [19]

Opheij

[11] Patent Number: 4,862,447
[45] Date of Patent: Aug. 29, 1989

[54] OPTICAL RECORD CARRIER WITH SURFACE LAYER EXTENDING TO THE CENTER OF A SUBSTANTIALLY CIRCULAR INFORMATION TRACK STRUCTURE THEREIN

[75] Inventor: Willem G. Opheij, Eindhoven, Netherlands

[73] Assignee: U.S. Philips Corporation, New York, N.Y.

[21] Appl. No.: 159,983

[22] Filed: Feb. 24, 1988

Related U.S. Application Data

[62] Division of Ser. No. 833,922, Feb. 27, 1986, Pat. No. 4,761,776.

[30] Foreign Application Priority Data

Dec. 11, 1985 [NL] Netherlands ............... 8503411

[51] Int. Cl.$^4$ .................................. G11B 7/00
[52] U.S. Cl. .......................... 369/270; 369/54; 369/280; 369/282
[58] Field of Search ............ 369/263, 264, 270, 271, 369/280, 282, 286, 54

[56] References Cited

U.S. PATENT DOCUMENTS

| | | | |
|---|---|---|---|
| 2,069,827 | 2/1937 | Harrison | 369/270 |
| 4,538,258 | 8/1985 | Miyako et al. | 369/282 |
| 4,546,465 | 10/1985 | Budinski et al. | 369/286 |
| 4,658,393 | 4/1987 | Ohta et al. | 369/286 |
| 4,719,615 | 1/1988 | Feyrer et al. | 369/286 |
| 4,780,867 | 10/1988 | Lind et al. | 369/286 |

*Primary Examiner*—Steven L. Stephan
*Attorney, Agent, or Firm*—Algy Tamoshunas; Leroy Eason

[57] ABSTRACT

An optical record carrier having a surface layer which includes a substantially circular information track structure, such surface layer extending without interruption substantially up to the center of the track structure. When the record carrier is supported on a rotating turntable and scanned by a scanning beam producing a scanning spot having a width transverse to the track direction of at least a few times the period of the track structure, a diffracted beam is produced by the track structure in a direction transverse to the local track direction. A radiation-sensitive detection system in the path of the diffracted beam produces output signals indicating any centering error between the center of the track structure and the axis of rotation of the turntable. Such signals can be employed to control positioning means to position the record carrier on the turntable so as to eliminate such centering error. Centering is thereby accurately achieved without requiring a center hole or other centering features in the record carrier.

5 Claims, 6 Drawing Sheets

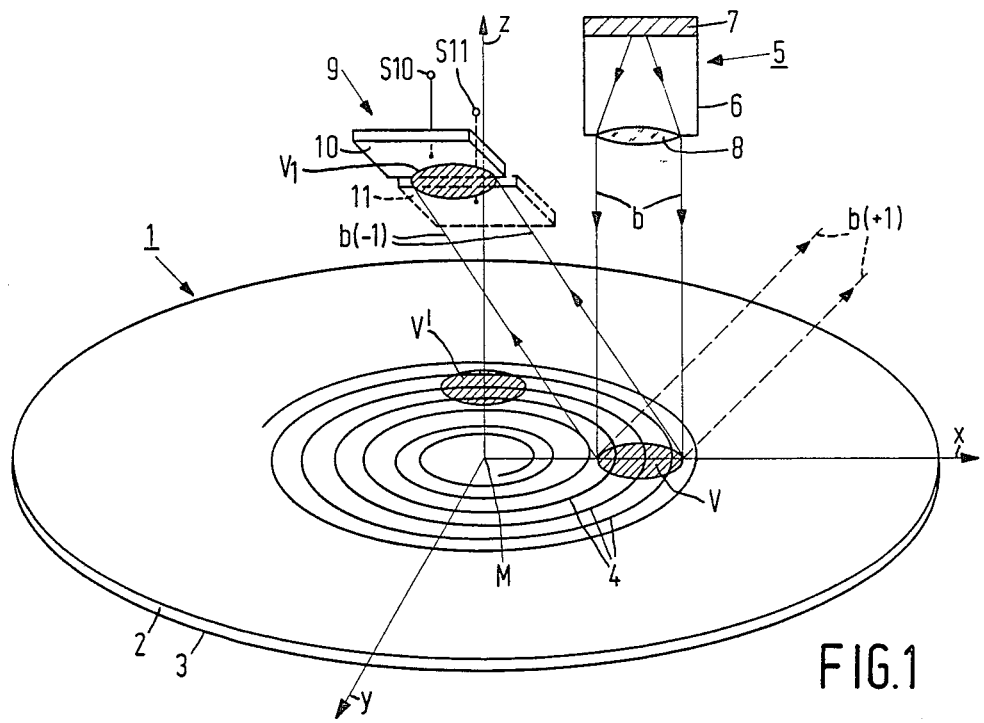
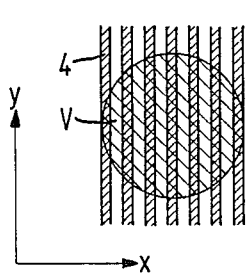 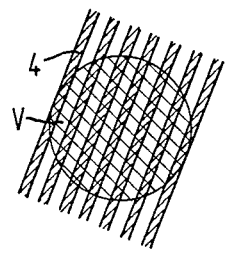 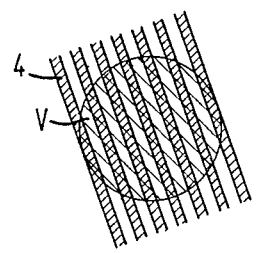
FIG.2a  FIG.2b  FIG.2c
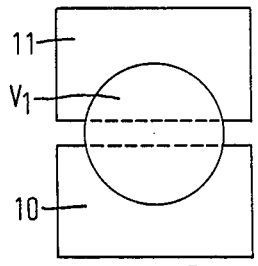 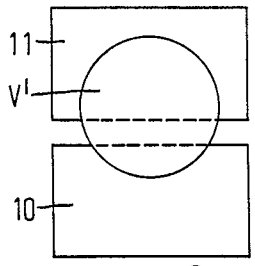 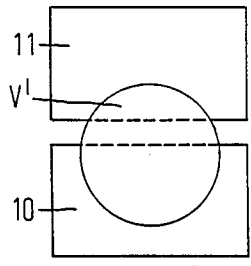
FIG.2d  FIG.2e  FIG.2f

OPTICAL RECORD CARRIER WITH SURFACE LAYER EXTENDING TO THE CENTER OF A SUBSTANTIALLY CIRCULAR INFORMATION TRACK STRUCTURE THEREIN

This is a division of application Ser. No. 833,922, filed Feb. 27, 1986, which issued to applicant herein on Aug. 2, 1988 as U.S. Pat. No. 4,761,776.

BACKGROUND OF THE INVENTION

1. Field of the Invention

Device for determining a centring error of a round track-shaped information structure in an optical record carrier relative to the axis of rotation of a turntable supporting the record carrier, apparatus provided with such a device, and record carrier intended for use in conjunction with said device.

The invention relates to an optical record carrier adapted for use in scanning apparatus, which includes a device for determining the centering error of a substantially circular information track structure in a surface layer of the substrate of an optical record carrier relative to the axis of rotation of a turntable supporting the record carrier. Such apparatus and device is described in the above U.S. Pat. No. 4,761,776. Such a device device comprises at least one radiation source for projecting a beam of radiation onto the information structure and a radiation-sensitive detection system for converting the resulting radiation thereform into an electric signal which is indicative of the centering error. The apparatus for scanning the record carrier produces an optical radiation beam in order to read and/or record information in the information track structure. This enables the novel record, carrier herein to be put to practical use owing to the centering-errors detection device and associated positioning means for positioning the centre of the track structure relative to the axis of rotation of the turntable.

The circular information track structure comprises a succession of adjacent concentric tracks, or a succession of quasi-concentric continuous tracks which together constitute a spiral track. These tracks may be inscribed partly or wholly with information, but alternatively they may be largely blank tracks in which a user can record the desired information. During information recording the blank tracks are also used as servo tracks in order to ensure that a write radiation spot accurately follows a specific path. A centring error is to be understood to mean the deviation, in two directions, between the centre of the concentric tracks or the spiral track and the axis of rotation of the turntable supporting the record carrier.

2. Description of the Related Art.

Optical record carriers in the form of disc-shaped records containing, for example, a video program or an audio program, are known as "Laservision Disc" and "Compact Disc" ("CD") respectively apparatus for reading these record carriers has been described frequently and comprehensively. By way of example reference is made to "Philips Technical Review", Vol. 33, No. 7, pages 178-193 and Vol. 40, No. 6, pages 149-155. An optical record carrier in which a user can record the desired information is described in: "IEEE Spectrum", August 1979, pages 26-33.

All the known ready-for-use record carriers have a centre hole by which they are slid onto a spindle when the record carrier is loaded into a write or read apparatus, so that the record carrier is fixed on a spindle and can be rotated by means of the spindle. The centre of the hole should very accurately coincide with the centre of the circular tracks or the spiral track and the diameter of this hole should be equal to the diameter of the spindle with a very high accuracy in order to ensure that during rotation of the record carriers the tracks practically do not move eccentrically or, in other words, practically do not wobble relative to the scanning unit. The read and write apparatus comprises a tracking system by means of which a deviation between the centre of the scanning spot and the centre line of a track being scanned can be detected and eliminated. This tracking system is intended for eliminating comparatively small tracking errors which arise as a result of vibrations in the read or write apparatus, or as a result of small deviations in the track spacings, etc. The tracking system can also eliminate tracking errors caused by a centering error but this is possible only to a limited extent, for example up to centering errors of the order of 100 $\mu$m. However, in practice the known record carriers may exhibit larger centering errors as a result of manufacturing tolerances. For example, the position of the centre of the hole relative to the centre of the track structure is subject to specific tolerances and the hole may exhibit out-of-roundness. Moreover, in the case of frequent use of the record carrier the hole therein may be subjected to wear, so that the record carrier is not tightly mounted on the spindle. For these reasons it is required to have a device by means of which such errors can be detected and corrected during reading and/or recording.

This need becomes even greater for novel uses of the optical track-shaped information structure, for example as a storage means in a disc or record which in addition to the optical storage means is provided with electronic or magnetic storage means, which disc or record may not be formed with a hole.

In the case of the known record carriers such as the "Compact Disc" the "Laservision Disc" and the digital optical disc of the direct-recording type referred to as "D.O.R." disc it may be advantageous if the record carrier need not be formed with a hole. This is not only because it is difficult to form this hole exactly at the desired location but also because stresses may be produced in the record-carrier material when this hole is formed, which stresses may give rise to changes in the optical properties of this material, which may impair a correct read-out or recording of the information structure.

In a customary record carrier of the direct-recording type the information layer is enclosed in an airtight manner between the substrate in which the information structure is formed and a disc which is spaced from the back of the substrate by an interposed spacer. If this record carrier is formed with a hole this hole should also be sealed, which is a difficult task.

If the known audio or video record carriers are to be constructed as double record carriers, i.e. record carriers having two reflecting information layers arranged back-to-back, forming a centre hole becomes even more difficult because this hole must be centred relative to the two track structures. In particular for a record carrier having two information layers and for the above-mentioned direct-recording type record carrier it is very advantageous if no hole is to be formed in the record carrier.

When the known audio or video record carriers with centre holes are manufactured these holes are generally formed after the track structure has been formed. It is then necessary to ascertain where the centre of the track structure is located, so that the tool by means of which the hole is formed can be centred relative to this centre. U.S. Pat. No. 3,915,576 describes an apparatus for this purpose. In this apparatus the entire record carrier is illuminated with a broad beam and the radiation originating from this record carrier is received by a single detector arranged behind a diaphragm having a small aperture. This detector receives only radiation originating from the track structure. The radiation originating from the trackless central portion of the information layer is stopped by an absorbing plate. The record carrier is positioned in such a way that a maximum amount of radiation is incident on the detector. The centre of the track structure is then situated on the line connecting the radiation source to the detector. In the apparatus in accordance with U.S. Pat. No. 3,915,576 the detector signal must be compared with a reference value. Moreover, it is possible only to ascertain whether the centre of the track structure is situated in line with the radiation source and the detector but it is not possible to determine the sign of a centering error. In order to determine this sign additional steps are necessary, which are not described in said Patent Specification.

SUMMARY OF THE INVENTION

It is an object of the present invention to provide a record carrier adapted for use in scanning apparatus which includes the improved centering error detection device of U.S. Pat. No. 4,761,776 by means of which both the magnitude and the sign of the centering error can be determined. Such centering device is characterized in that the radiation source produces a radiation beam whose cross-section at the location of the information track structure and transverse to the local track direction is of the order of at least a few times up to several thousands of times the period of the track structure a radiation-sensitive detection system comprising two detectors is arranged in the path of a first-order diffraction beam which is formed as a result of the radiation beam being diffracted transversely of the local track direction by the information structure, the difference between the output signals of these detectors representing the centering error signal.

Since the track structure is scanned with a spot whose diameter is equal to at least a plurality of track periods, this structure will behave as a diffraction grating which splits the incident radiation beam into different diffraction orders. The invention is based on the recognition of the fact that when the track structure is moved relative to the radiation spot the track direction at the location of this spot changes and consequently changes of direction can be detected by means of two detectors whose separating line extends substantially transversely of the direction in which one of the diffracted beams moves in the case of a displacement of the track structure. For this purpose one of the first-order beams is selected because it has the highest intensity. The detector signals are compared with each other, rather than with a reference value, and this comparison directly yields both the magnitude and the sign of a centring error in one direction.

The centering device can be constructed by means of simple and inexpensive elements and is therefore very suitable for use in apparatus for reading and inscribing the record carrier, which apparatus are intended as consumer products. The device may be employed both for positioning a record carrier with or without the centre hole on the turntable prior to scanning and for checking whether the track structure keeps rotating about the centre during scanning. The device may also be employed in the manufacture of a record carrier having a centre hole in order to ensure that this hole is formed at the correct location.

Another advantage of such device is that the positions of the detectors and the radiation source are non-critical. Although an optimum centering error signal is obtained by means of a device which is characterized further in that the separating line between the detectors is situated in the plane containing the centre of the radiation source and the axis of rotation, a suitable centering error signal may also be obtained in the case of considerable deviations from these optimum positions.

In order to enable a deviation between the centre of the track structure and the axis of rotation to be detected in two different directions, a preferred embodiment of the device is characterized further by a second radiation source and a second radiation-sensitive detection system comprising two detectors, the second radiation-sensitive detection system being arranged in the path of the first-order diffraction beam which is formed as a result of the radiation beam emitted by the second radiation source being diffracted transversely of the track direction by the information structure.

For obtaining an optimum centering error signal this device is preferably characterized further in that the centre of the second radiation source, the axis of rotation and the separating line between the two detectors of the second radiation-sensitive detection system are situated in a second plane which extends at an angle to the first plane containing the centre of the first radiation source, the axis of rotation and the separating line between the detectors of the first radiation-sensitive detection system.

It is to be noted that, in order to form a hole in an optical record carrier, it is known from German Offenlegungsschrift No. 3,300,208 (which has been laid open to public inspection) to determine the location of the centre of the track structure of this record carrier by means of at least three elongate radiation spots which are each associated with a separate single detector. In the device in accordance with German Offenlegungsschrift No. 3,300,208, however, the radiation spots are projected on the transition between the track structure and the trackless centre portion of the record carrier, and not on the track structure itself. The intensity of each beam originating from the record carrier is then measured with a single respective detector, which intensity is determined by the radial position of the associated radiation spot relative to said transition. Moreover, the radiation spots are moved periodically in a direction transverse to said transition. The size of the radiation spots is not specified and, moreover, there is no mention of first-order diffraction beams.

Preferably, a centering device employing two radiation beams is characterized further in that the angle between the first plane and the second plane is approximately 90°. The centring error can then be resolved into two components along two orthogonal axes of a coordinate system whose origin coincides with the axis of rotation. These error components are then independent of one another and can be eliminated separately and consecutively.

In order to obtain a maximum sensitivity the centering error detection device is characterized further in that the radiation spots formed on the information surface by the radiation beams are situated close to the centre of the track structure. The tracks which are situated nearest the centre have the largest curvature and in the case of a displacement relative to the radiation spots they produce the largest change in direction of the grating relative to these spots and consequently the largest displacement of the diffracted beams over the detectors.

Such a device may be characterized further in that a first detection system and a second detection system are combined to form a detection system comprising four detectors situated in different quadrants around the axis of rotation. The two radiation sources are situated off the axis of rotation at such locations that the radiation spots formed on the detectors by the corresponding diffracted first-order beams are superimposed when the centre of the track structure coincides with the axis of rotation.

In order to obtain full information about a centering error in the case of a record carrier having a spiral track structure whose spiral extends substantially to the centre, it is not necessary that the device comprise two radiation sources and two detector pairs. In such a case all the centring information can also be obtained by means of a device comprising one radiation source and one radiation-sensitive detection system if this device is characterized further in that one of the elements, comprising the radiation spot formed on the record carrier, the record carrier, and the detection system, performs a periodic movement relative to the other two elements. The magnitude of the detector signals relative to one another is then representative of the magnitude of the centering error, whilst the sign of a centering error is obtained by comparing the phase of the detector difference signals with the phase of the periodic movement.

In a first embodiment a device comprising one radiation source and one radiation-sensitive detection system is characterized further in that the radiation spot is moved periodically over the record carrier along two orthogonal directions and in that the detection system comprises four detectors which are situated in different quadrants around the axis of rotation.

In a second embodiment a device comprising one radiation source and one radiation-sensitive detection system is characterized further in that the radiation spot is moved periodically over the record carrier along two directions at different frequencies and in that the detection system comprises one detector.

Preferably, the device is characterized further in that each radiation source comprises a light-emitting diode followed by a lens, which assembly produces a substantially parallel beam, and in that each detector comprises a phototransistor. A very satisfactory signal can be generated using these cheap means.

In accordance with a further characteristic feature of the device a radiation source and an associated radiation-sensitive detection system are arranged on a common support.

The novel optical record carrier is usable in an apparatus for scanning the surface thereof which is provided with a substantially circular information track structure, which apparatus comprises an optical scanning unit producing a scanning beam and a turntable for rotating the record carrier relative to the scanning unit. This apparatus is characterized in that it is provided with an error detection a device producing output signals which are applied to the inputs of a control circuit for controlling positioning means which cooperate with the record carrier to position the centre of the track structure relative to the axis of rotation of the turntable.

Scanning by means of a radiation beam is to be understood to mean both scanning for the purpose of reading a prerecorded record carrier and scanning for the purpose of making a recording on a record carrier having a preformed servotrack structure.

An apparatus for reading a prerecorded record carrier is characterized further in that the scanning unit emits a read beam and comprises a radiation-sensitive detection system for converting the radiation modulated by the information structure and originating from the record carrier into an electric signal which is representative of the information being read and into an electric signal for the purpose of tracking and/or focussing.

An apparatus for recording information in an information surface of a record carrier, which layer is provided with preformed optically detectable servo tracks, is characterized further in that the scanning unit comprises a modulator for modulating the intensity of the radiation beam in conformity with the information to be recorded and a radiation-sensitive detection system for converting the radiation originating from the information surface into an electric signal for the purpose of tracking and/or focussing.

The apparatus may also be used in the manufacture of record carriers to position the track structure exactly relative to a tool by means of which a hole is formed in the record carrier, and also in conjunction with ready-for-use record carriers having a centre hole to realize a kind of coarse tracking method. In addition, the apparatus enables a novel type of record carrier to be put to practical use. This record carrier forms the present invention and is characterized in that the the surface layer which contains the information track structure is an uninterrupted layer which extends up to the centre of such information track structure.

Such a novel record carrier may occur in various embodiments. A first embodiment is characterized in that the information track structure extends substantially up to the centre of said structure, tracks situated in a vicinity closet to the centre containing no information.

The tracks in the closet vicinity to the centre do not contain information because at a constant scanning speed the information areas in these tracks would be too short and in the case of a constant average length of the information areas the scanning speed or speed of rotation of the record carrier would be too high. The informationless portion of the track structure near its centre, however, may be employed for the purpose of centring-error detection.

The novel record carrier may be characterized further in that tracks which are situated outside the direct vicinity of the centre are filled with information. This record carrier, which is of the read-only type, contains, for example, an audio program or a video program.

The novel record carrier may also be adapted to be inscribed by a user and is then characterized further in that the information layer is provided with preformed optically detectable tracks provided with sector addresses which contain the addresses of the associated blank track portions provided with an optical recording medium.

Both the prerecorded and the direct-recording novel record carrier may be characterized in that there is provided a second information layer, in that both information layers are radiation-reflecting and face one another with their non-reflecting sides.

BRIEF DESCRIPTION OF THE DRAWING

The invention will now be described in more detail, by way of example, with reference to the accompanying drawings. In the drawings:

FIG. 1 illustrates the principle of the centering error-detection device,

FIGS. 2a to 2f show different directions of the tracks relative to the radiation spot formed on these tracks and the corresponding positions of the image of this radiation spot formed on the detectors.

DESCRIPTION OF THE PREFERRED EMBODIMENTS

Figure 3:
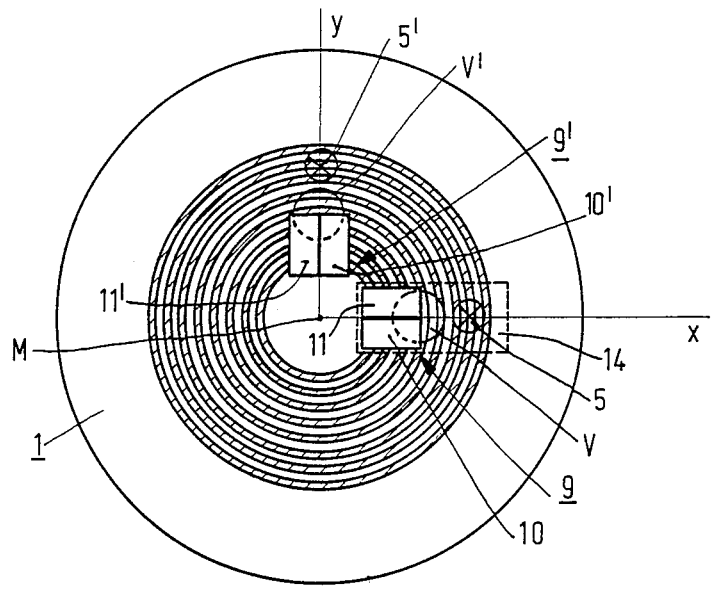
FIG. 3 shows a centering device embodiment comprising two radiation sources and two radiation-sensitive detection systems.

FIG. 1 shows a record carrier 1 having an information surface 3. This surface is, for example, radiation-reflecting and is formed on a transparent substrate 2. The information surface is formed with a multitude of concentric or quasi-concentric tracks 4 which have been or can be provided with information. Only a few of this multitude of tracks are shown on an enlarged scale. The centre of the track structure bears the reference M. The device to be described hereinafter serves for determining the position of this centre relative to a desired position in an apparatus intended for use in conjunction with the record carrier. The desired position can be defined by the origin O of an XYZ coordinate system. This origin O coincides, for example, with the axis of rotation of a turntable, not shown, in the apparatus, which turntable supports the record carrier.

The device comprises a radiation source 5 which emits a radiation beam b, for example a parallel beam. The radiation source may comprise a light-emitting diode 7 and a lens 8 accommodated in a common housing. Such a composite radiation source is commercially avialable at low cost. The beam b is projected on the information layer onto an area V whose diameter is of the order of magnitude of a few times up to several thousands of times the period of the track structure. This structure then behaves as a diffraction grating which diffracts the incident beam b into a zero-order reflected subbeam, two first-order reflected subbeams $b(+1)$, $b(-1)$, and a plurality of higher-order subbeams. Only one of the first-order reflected subbeams is utilized because these beams have the highest radiation intensity on account of the geometry of the track structure, said geometry being optimized for the purpose of reading. In the case of perpendicular incidence of the beam b on the information surface, as is assumed in FIG. 1, the zero-order subbeam is reflected perpendicularly so that this beam has the same direction as the beam b. The first-order and higher-order subbeams are diffracted through specific angles. If the chief ray of the incident beam extends perpendicularly to the local track direction, i.e. the direction of the tracks at the location of the radiation spot V, the chief rays of all the diffracted beams are situated in a plane transverse to the local track direction. A radiation-sensitive detection system 9 comprising two radiation-sensitive detectors 10 and 11 is arranged in the path of the first-order subbeam $b(-1)$. The reflected beam $b(-1)$ forms a radiation spot $V_1$ on this detection system. Suitably, the detectors 10 and 11 are positioned in such a way that their separating line is disposed in the plane through the centre of the radiation source 5 and the Z-axis, i.e. the XZ-plane in FIG. 1. In the drawing the detectors are slightly tilted about the X-axis for the sake of clarity. The detector 10 is situated before the XZ-plane and the detector 11 is situated behind this plane.

FIG. 1 illustrates the situation in which the centre M of the track structure, viewed in the Y-direction, occupies the correct position, i.e. is situated on the X-axis. At the location of the radiation spot V the tracks then extend in the Y-direction, as is shown in FIG. 2a. The direction of the chief ray of the beam $b(-1)$ is then situated in the XZ-plane so that the radiation spot $V_1$ is situated symmetrically relative to the detectors 10 and 11, as is shown in FIG. 2d. The output signals $S_{10}$ and $S_{11}$ of the detectors are then equal and the difference signal $S_y = S_{10} - S_{11}$, representing the positional error in the Y-direction, is then zero.

If the entire record carrier and consequently its centre M is shifted in the Y-direction, for example backward, the tracks at the location of the radiation spot have another direction, namely the direction indicated in FIG. 2b. The direction of the chief ray of the beam $b(-1)$ is then no longer situated in the XZ-plane but behind this plane, so that a larger part of the spot $V_1$ is situated on the detector 11 and a smaller part is situated on the detector 10, as is shown in FIG. 2e. The signal $S_y = S_{10} - S_{11}$ is then negative.

If the record carrier is shifted forward in the Y-direction the tracks at the location of the radiation spot V will have the direction indicated in FIG. 2c and the chief ray of the beam $b(-1)$ will be situated in front of the XZ-plane, so that the larger part of the radiation spot $V_1$ is now incident on the detector 10, as is shown in FIG. 2f. The signal $S_y$ is then positive.

Thus, the signal $S_y$ contains information about the magnitude and the sign of a positional error of the centre M along the Y-axis.

Similarly, by means of a second radiation source 5' and a second detection system 9', the separating line between the detectors of this system and the centre of the radiation source being suitably disposed in the YZ-plane, it is possible to generate a signal $S_x$ which represents the magnitude and the sign of the positional error of the centre M in the X-direction relative to the origin O of the coordinate system XYZ. For the sake of simplicity FIG. 1 only shows the radiation spot V' which is formed on the record carrier by the second radiation source. The second radiation source 5' and the second detection system 9' comprising the detectors 10' and 11' are shown schematically in FIG. 3. This Figure is a plan view of the radiation sources, the detection systems, and the record carrier.

The arrangement shown in FIG. 3 is the most suitable arrangement. In this arrangement the plane containing the centre of the radiation source 5 and the separating lines of the detectors 10 and 11, which plane is represented by the X-axis in FIG. 3, extends perpendicularly to the plane containing the centre of the radiation source 5' and the separating lines of the detectors 10' and 11', which plane is represented by the Y-axis in FIG. 3. Indeed, the signals $S_x$ and $S_y$ are then independent of each other and the positional errors of the centre M in the X-direction and the Y-direction can be detected independently of each other and one after the other. However, alternatively, said planes may make angles smaller than 90° with each other. For detecting the positional centering error signified by one of the signals $S_x$ and $S_y$ the other such signal should then be reduced to zero iteratively.

It is to be noted that the situation illustrated in FIGS. 1 and 3 is the ideal situation in which the center of the radiation sources, 5 and 5' respectively, and the separating line of the detectors, 10, 11 and 10', 11' respectively, are disposed in line with a point of the axis of rotation Z. However, also for deviations from this relative position acceptable positional-error signals can be obtained. For example, the separating line of the two detectors may be rotated outside the plane containing the centre of the radiation source and the axis of rotation or the centre of the detection system or the centre of the radiation spot may be situated outside this plane.

Preferably, a radiation source and the associated detection system comprising two detectors are arranged on a common support, bearing the reference numeral 14 in FIG. 3. This support may be slightly curved. During assembly of the device comprising one or two such common supports adjustment is comparatively simple. A reference record carrier whose track-structure centre is positioned accurately relative to the axis of rotation is then mounted in the device. Subsequently, the common support carrying the radiation source and the two detectors is adjusted to roughly the desired position and tilted in such a way that the difference between the signals from the detectors is zero. The alignment of the radiation source and the detectors relative to one another is then correct.

Suitably, the radiation spots are positioned on the inner tracks. Since these tracks have the largest radius of curvature a displacement of the record carrier will give rise to the largest change in track direction at the location of the radiation spots V and V' and consequently the largest shift of the spots $V_1$ and $V'_1$ over the associated detectors. This results in a maximum sensitivity of the device.

Figure 4:
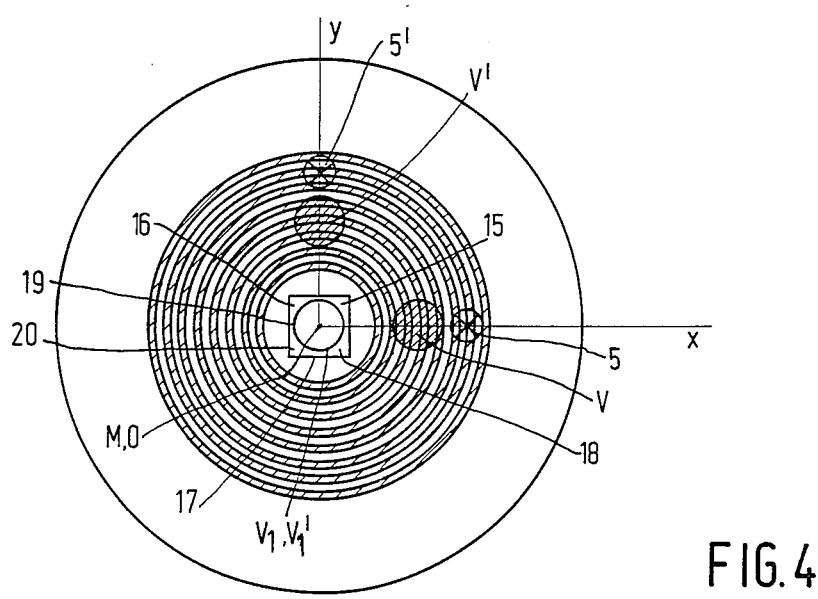
FIG. 4 shows a centering device embodiment comprising two radiation sources and one four-quadrant detector.

For these positions of the radiation spots V and V' it is alternatively possible to use a combined detection system as shown in FIG. 4 instead of two separate detection systems. The combined detection system comprises four detectors 15, 16, 17 and 18 which are disposed in four different quadrants around the axis of rotation through the point O. The separating lines 19 and 20 between the detectors preferably extend in the X-direction and the Y-direction respectively. The positional error signals in the X-direction and the Y-direction respectively are now given by:

$$S_x = (S_{15} + S_{16}) - (S_{17} + S_{18})$$

$$S_y = (S_{16} + S_{17}) - (S_{15} + S_{18})$$

Figure 5:
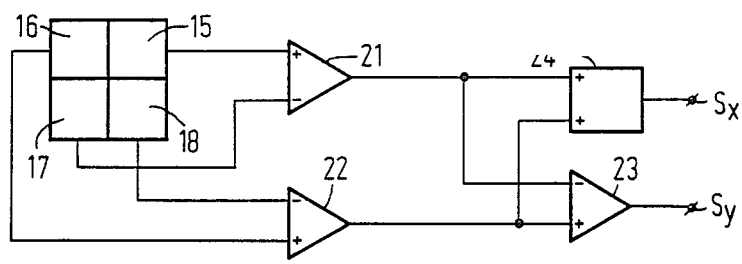
FIG. 5 shows an example of an electronic circuit for processing the signals supplied by this device.

The signals $S_x$ and $S_y$ can be derived by means of a simple electronic circuit, of which an example is shown in FIG. 5. This circuit comprises three differential amplifiers 21, 22 and 23 and a summing device 24. The circuit generates the signals $$(S_{15} - S_{17}) + (S_{16} - S_{18}) = S_x \text{ and}$$

$$(S_{16} - S_{18}) - (S_{15} - S_{17}) = S_y$$

Figure 6:
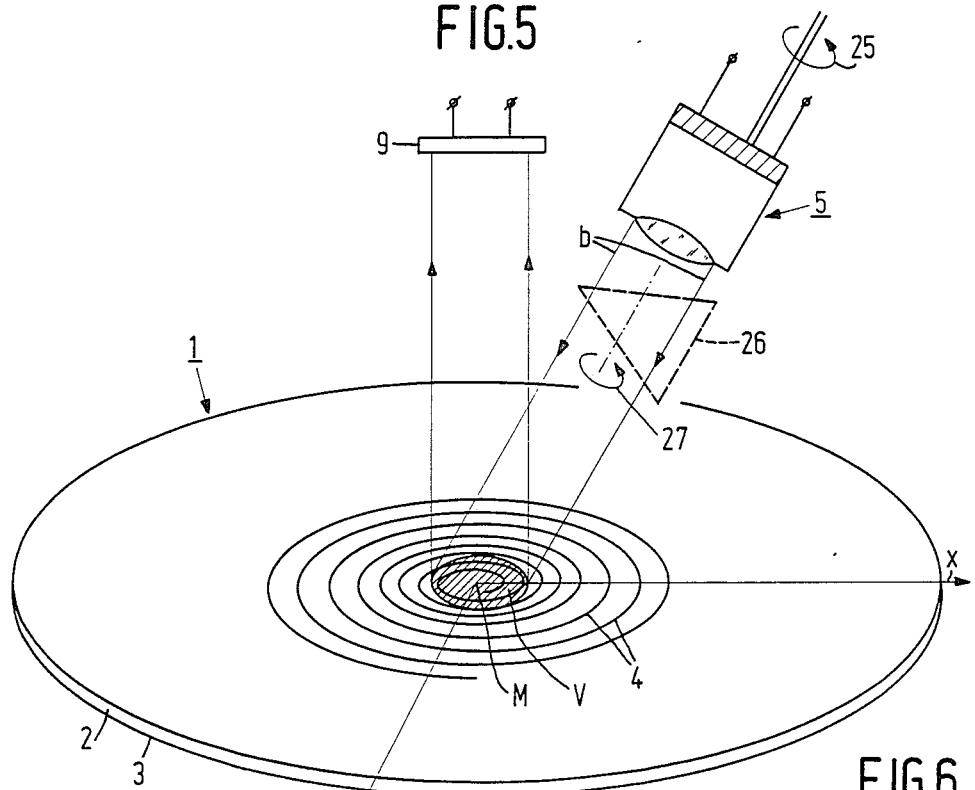
FIG. 6 shows a centering device in an embodiment comprising one radiation source and one radiation-sensitive detection system.

FIG. 6 shows the device in accordance with the invention in another embodiment. This device is suitable for determining the position of the centre M of a spiral track which extends almost up to centre. The single radiation spot V is now incident on the central portion of the track structure and the first-order radiation beam which has been diffracted by the track structure is now incident on one radiation-sensitive detection system.

Figure 7:
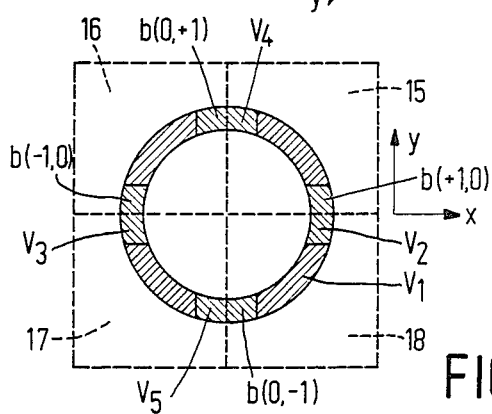
FIG. 7 shows the shape of the radiation spot formed on the detectors in said device.

The radiation spot $V_1$ formed in the plane of the detection system is now annular if the track-shaped information structure is centred correctly. This annular shape is shown in FIG. 7. If the centre of the track structure is shifted in the X-direction, the annulus contracts to form two radiation spots $V_2$ and $V_3$. If the track structure is shifted in the Y-direction the annulus changes into two radiation spots $V_4$ and $V_5$. The detection system comprises, for example, four detectors 15, 16, 17 and 18 which are arranged in four different quadrants around the axis of rotation. By comparing the output signals of these detectors it is possible to determine the magnitude of the centring error in the X-direction and the Y-direction.

In order to determine not only the magnitude but also the sign of the deviation between the actual position and the desired position of the centre of the track-shaped structure the radiation spot V is moved periodically, for example in the X- and Y-direction, and the phases of the difference signals from the detectors are compared with the phases of the movements of the spot in the directions corresponding to said detectors. The oscillations of the spot in the X-direction and the Y-direction may have the same frequency. If the radiation spot V is oscillated at two different frequencies the directions in which the spot V is oscillated need not be perpendicular to each other. The detection system then need not comprise four detectors but it is possible to employ a single central detector arranged at the location of the four-quadrant detector 15, 16, 17, 18. The periodic movements of the radiation spot V can be realised in various manners. For example, the radiation source 5 itself can be rotated about an eccentric axis 25. It is alternatively possible to arrange a radiation-transmitting plane-parallel plate in the radiation path from the radiation source to the record carrier, which plate is tilted periodically about two axes, or to provide a radiation-transmitting wedge 26 which rotates about an axis 27 or a mirror which rotates about an eccentric axis. Further, it is possible to move the detectors or the record carrier periodically instead of the radiation spot V.

An advantage of the device in accordance with the invention is that the resulting signals are insensitive to a variation in the period of the track structure. A radiation spot V is used which covers a plurality of tracks and a variation in the track period can cause the radiation spot $V_1$, $V_1'$ to be shifted over the detectors only in the direction of the separating lines between the detectors. A possible variation in the wavelength of the radiation used can only give rise to a shift of the radiation spot $V_1$, $V_1'$ in the direction of these separating lines, so that the device is also insensitive to this variation.

Figure 8:
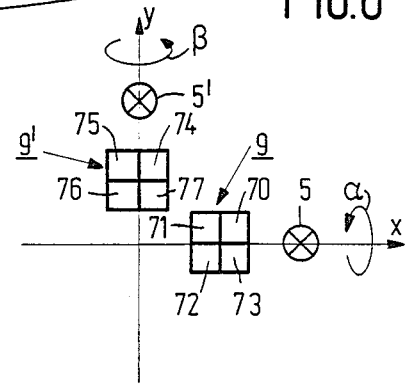
FIG. 8 shows a centering device embodiment which also enables tilting errors of the record carrier to be measured.

For an accurate measurement by means of the device it is required that the record carrier is perfectly flat and is not tilted or that such a tilt can be detected to enable it to be compensated for. Tilting of the record carrier gives rise to a shift of radiation spot $V_1$, $V_1'$ in a direction transverse to the direction in which this radiation spot moves upon a displacement of the centre M. Therefore, a tilt can be measured if the two detectors 10, 11 and 10', 11' in the device shown in FIG. 3 are replaced by four detectors 70, 71, 72, 73 and 74, 75, 76, 77 respectively, as is shown in FIG. 8. The centring-error signals are given by:

$$S_x = (S_{74} + S_{77}) - (S_{76} + S_{75})$$

$$S_y = (S_{70} + S_{71}) - (S_{72} + S_{73})$$

and the signals representing the tilt about the X-axis ($S_\alpha$) and the tilt about the Y-axis ($S_\beta$) respectively are given by:

$$S_\alpha = (S_{70} + S_{73}) - (S_{71} + S_{72})$$

$$S_\beta = (S_{74} + S_{75}) - (S_{76} + S_{77})$$

The degree of tilting can also be determined by means of a separate radiation source, for example a light-emitting diode, and a separate radiation-sensitive detection system which is arranged in the path of the zero-order beam issuing from the record carrier.

Figure 9:
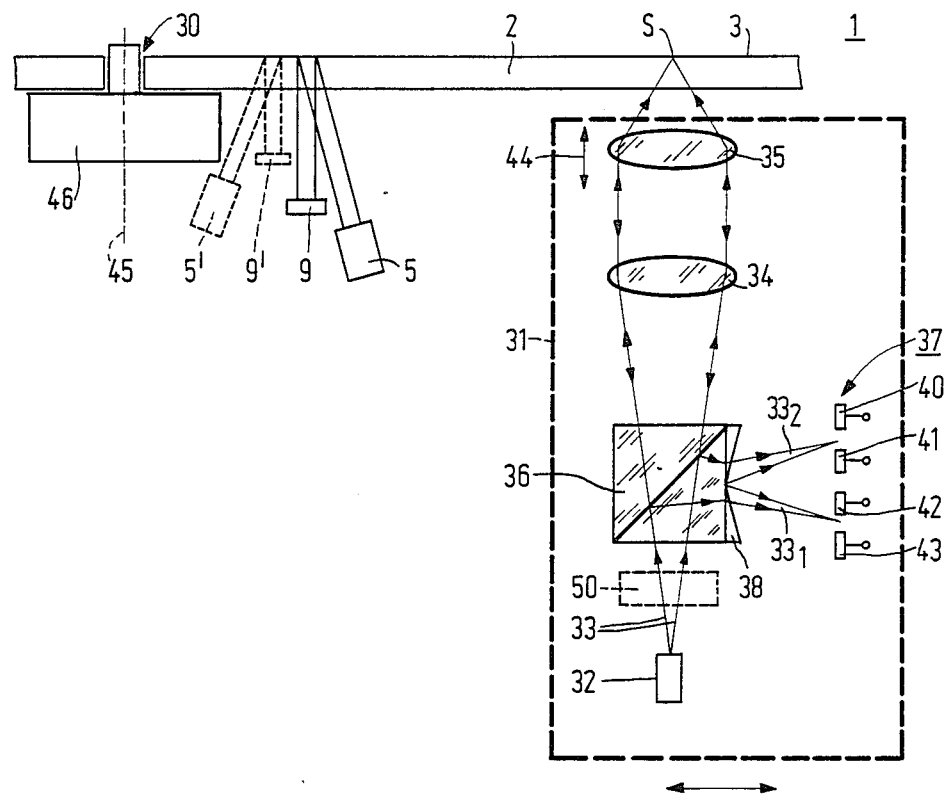
FIG. 9 shows an apparatus for reading and/or inscribing a record carrier, provided with said device.

FIG. 9 shows an apparatus for reading an optical record carrier 1 with a centre hole 30. This apparatus is equipped with a read unit 31 which comprises, in this order, a radiation source 32, for example a diode laser, a collimator lens 34, and an objective 35 which focusses the read beam 33 on the information surface 3 to form a small radiation spot S having dimensions of the order of magnitude of the information details to be read. The read beam reflected by this surface is separated from the projected beam by a beam splitter, for example a separating prism, 36 and is diverted to a radiation-sensitive detection system 37 which converts the modulated read beam into, inter alia, a signal representing the information being read.

In order to enable a focussing error of the read beam relative to the information surface 3 to be detected there is provided a wedge 38 which splits the reflected beam into two subbeams and the detection system 37 comprises four detectors 40, 41, 42 and 43. As is known from inter alia U.S. Pat. 4,489,408 the focussing-error signal $S_f$ is given by:

$$S_f = (S_{40} + S_{43}) - (S_{41} + S_{42})$$

where $S_{40}$, $S_{41}$, $S_{42}$ and $S_{43}$ are the output signals of the detectors 40, 41, 42 and 43. This signal enables, for example, the axial position of the objective 35 to be controlled, as is indicated by the arrow 44 in FIG. 7.

The information signal $S_I$ is then:

$$S_I = S_{40} + S_{41} + S_{42} + S_{43}.$$

By means of these four detectors it is also possible to derive a tracking signal $S_r$, i.e. a signal which is indicative of a deviation between the centre of the read spot S and the central axis of the track to be scanned. This signal, which is represented by:

$$S_r = (S_{40} + S_{41}) - (S_{42} + S_{43}),$$

is used for controlling the radial position of the read spot S, for example by moving the objective 35 or the entire read unit 31 in a radial direction.

Figure 10:
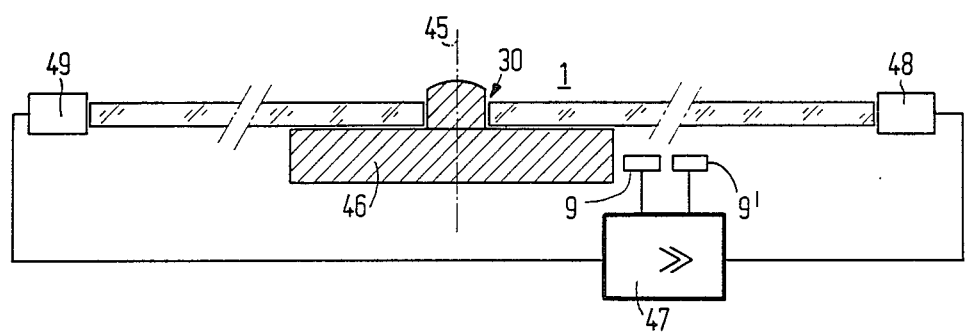
FIG. 10 shows a centering device embodiment comprising means for positioning the record carrier relative to the turntable.

In order to enable to detect, after the record carrier has been mounted in the apparatus, whether the centre M of the track structure coincides with the axis of rotation 45 of a turntable 46 the apparatus is equipped with a device as described above, which device comprises two radiation sources 5 and 5' and two detection systems 9 and 9' arranged as shown in FIGS. 1 and 3. In the apparatus shown in FIG. 9 the radiation source 5 and the detection system 9 are situated, for example, before the plane of the drawing and the radiation source 5' and the detection system 9' are situated behind this plane. The signals from the detection systems 9 and 9' may be applied to a differential amplifier 47 which drives, for example, four actuators which act on the edge of the record carrier 1, as is shown in FIG. 10. In this Figure only two of these actuators 48 and 49 are shown schematically. The two other actuators are situated before and behind the plane of the drawing of FIG. 10. The actuators may be, for example, electromechanical or piezo-electric elements.

After the record carrier has been positioned on the turntable in such a way that the centre of the track structure coincides with the axis of rotation 45 it is fixed on the turntable in this position by known means such as mechanical clamping means, electromagnetic clamping means, a pressure member or a partial vacuum between the turntable and the record carrier. The turntable with the record carrier can then be set into rotation and reading may begin.

As the record carrier rotates the device for detecting a centring error may remain operative to ascertain whether the centring of the track structure relative to the axis of rotation is maintained.

Apart from in a read apparatus the device in accordance with the invention may be used in a recording apparatus. In principle this apparatus may be of the same construction as the read apparatus as shown in FIG. 9, but it comprises an additional element constituted by a modulator (50 in FIG. 9) by means of which in conformity with the information to be written the intensity of the scanning beam is switched between such a high level that locally an optically detectable change in the information layer is produced and a lower level which does not give rise to such a change. The latter level may be, for example, sufficiently high to read information already present and to generate a tracking error and/or focussing-error signal. If the radiation source is a diode laser the intensity of the laser beam can also be switched directly by means of a pulsating electric current through the diode laser, so that a separate intensity modulator is not required.

The principal advantage of the device in accordance with the invention is obtained when this device is combined with an optical record carrier which does not have a centre hole for cooperation with a spindle. Since the device is designed in such a way that it can be constructed by simple and inexpensive means, it is suitable for use in low-cost mass-produced read or write apparatuses. Such low-cost suitably adapted write and/or read apparatuses enable record carrierswithout centre holes to be used for the first time on a large scale. Therefore, such novel record carriers fall within the scope of the present invention. These record carriers are ready for use and should not be confused with the intermediate products obtained in the manufacture of the known record carriers and not yet formed with a hole.

The novel record carrier has the following advantages:
stresses which arise in the material of the record carrier when a hole is formed will not occur,
a difficult and expensive step in the manufacturing process may be dispensed with,
in principle a larger part of the information surface is available for information storage.

The record carrier in accordance with the invention is based on the recognition of the fact that for the rotation of the record carrier required for scanning the information surface it is not absolutely necessary to have a hole in the record carrier and a spindle on the turntable, but that the record carrier can also be retained on the turntable in other ways, provided that there are means for positioning the centre of the track structure relative to the axis of rotation of the turntable with adequate accuracy.

Figure 11:
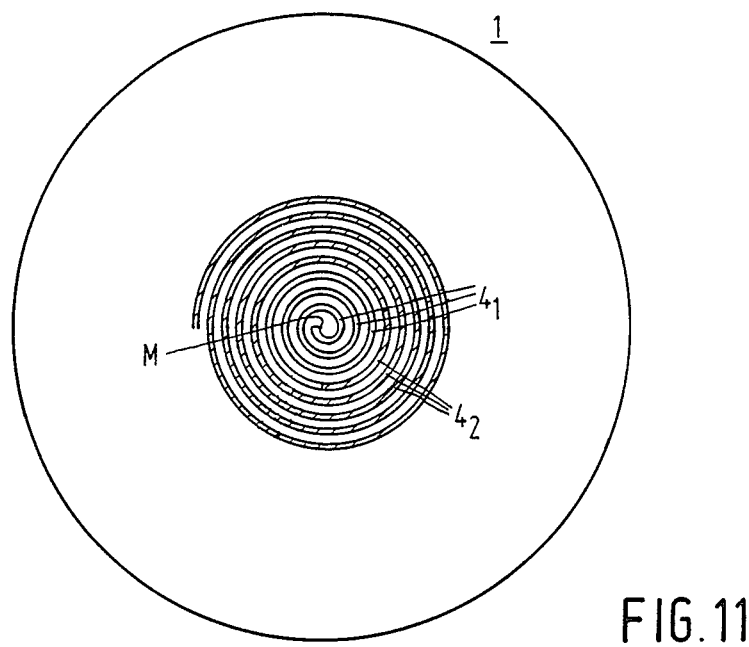
FIG. 11 shows a record carrier without centre hole in accordance with the invention in a first embodiment.
Figure 12:
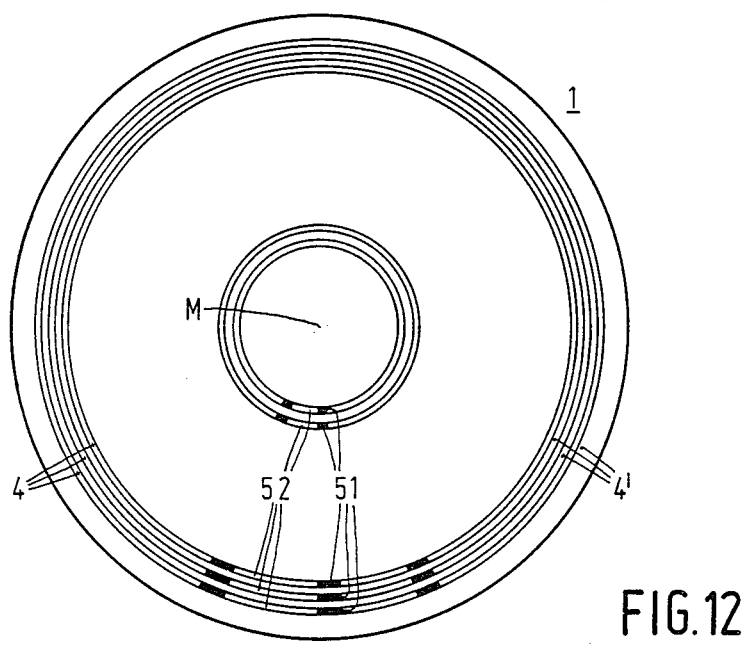
FIG. 12 shows such a record carrier in a second embodiment.

FIG. 11 is a plan view of an embodiment of the novel record carrier. The centre of the track structure again bears the reference M and the tracks themselves bear the reference numeral 4. The inner tracks $4_1$, situated within a radius of, for example, a few tenths of millimeters do not contain information and comprise grooves or plane strips which optically differ from the intermediate lands $4_0$. Only the tracks $4_2$ which are situated at a larger distance from the centre are utilized for information storage. These tracks $4_2$ may be fully prerecorded. However, alternatively, as is shown in FIG. 12, the tracks $4_2$ may be largely empty and are only provided by the manufacturer with sector addresses 51 which contain inter alia the addresses of the associated recordable track portions 52. For further particulars on direct-recording record carriers reference is made to U.S. Pat. 4,363,116.

Particularly, if the described record carrier has a "sandwich" structure, i.e. a disc is arranged at some distance from the back of the information surface to provide air-tight sealing of the information surface together with the substrate, it is very advantageous if no centre hole is to be formed because this may give rise to sealing problems at the location of this hole.

Figure 13:
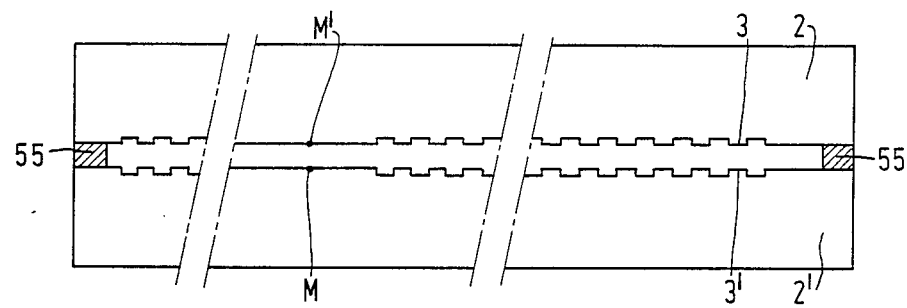
FIG. 13 shows such a record carrier in a third embodiment.

FIG. 13 is a radial cross-sectional view of a double version of the record carrier shown in FIG. 11. The information surfaces 3 and 3' respectively, of the two record carriers 1 and 1' respectively, have transparent substrates 2 and 2' respectively. The information surfaces face each other and are secured to one another with an interposed spacer 55. Since the assembled record carrier need not be formed with a centre hole which has to be centered relative to both track structures, these two track structures need not be aligned very accurately relative to each other, which considerably simplifies the manufacture of this type of double record carrier.

Figure 14:
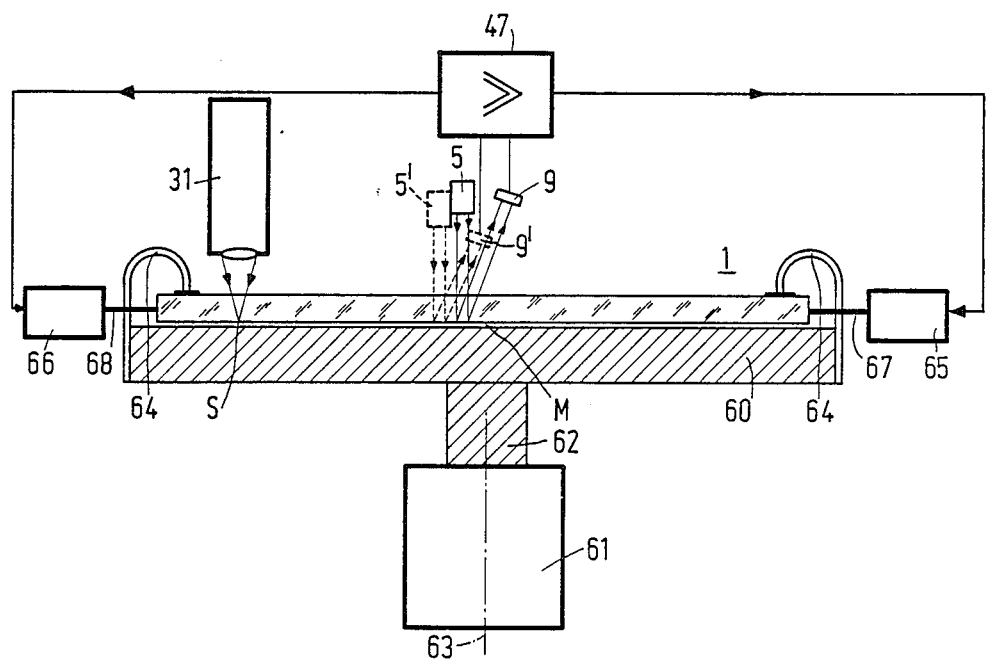
FIG. 14 shows an apparatus for recording and/or inscribing the novel record carrier.

The novel record carriers shown in FIGS. 11, 12 and 13 can be read and/or inscribed by means of the optical scanning unit shown in FIG. 9. In FIG. 14, which shows an example of an apparatus for reading and/or inscribing the novel record carrier, this scanning unit has the reference numeral 31. The radiation spot S formed by this unit scans the information surface 3 of the record carrier 1. This record carrier is supported by a turntable 60 whose diameter is at least equal to that of the record carrier. A motor 61 drives the turntable via a spindle 62. The record carrier can be fixed in position on the turntable in various manners. For example, the turntable may be provided with resilient clamps 64 which cooperate with the edge of the record carrier. Another possibility is to provide the turntable with an electromagnet which cooperates with a magnetic layer on the record carrier. Yet another possibility is to provide the turntable with air ducts through which air between the record carrier and the turntable can be drawn off, so that a partial vacuum is obtained and the record carrier is drawn against the turntable.

Further the apparatus comprises, for example, two additional radiation sources 5 and 5' and two radiation-sensitive detection systems 9 and 9' for detecting the position of the centre M of the track structure relative to the axis of rotation 63 of the turntable. The signals from the detection systems 9 and 9' are applied to a control amplifier 47 which drives a number of, for example electromechanical or piezo-electric, actuators 65, 66. These actuators are connected to rods 67, 68 by means of which the record carrier can be moved relative to the turntable.

What is claimed is:

1. An optical record carrier comprising a substrate having a planar surface layer which includes a substantially circular information track structure therein which may be scanned during rotation of said record carrier by a beam of radiation producing a scanning spot thereon; said planar surface layer extending without interruption substantially up to the center of said information track structure; said track structure producing, when said scanning spot has a width transverse to said tracks of at least a few times the period of said tracks, a diffracted beam of radiation in a direction indicative of deviation between the center of said track structure and the axis of rotation of said record carrier.

2. An optical record carrier as claimed in claim 1, characterized in that said track structure co-extends with said surface layer substantially up to the center of said track structure, and in that a plurality of tracks situated in a vicinity nearest to the center of said track structure do not have any information recorded therein.

3. An optical record carrier as claimed in claim 2, characterized in that all tracks situated outside said vicinity nearest to the center of said track structure have information recorded therein.

4. An optical record carrier as claimed in claim 1 or 2, wherein a plurality of tracks of said track structure are adapted to be inscribed with information during scanning thereof, and have preformed optically detectable sector address portions therein which identify adjoining blank portions of said tracks, said blank portions of said tracks having an optical recording medium thereon.

5. A record carrier as claimed in any of claims 1, 2 and 3, further comprising a second substrate having a planar surface layer which includes a second substantially circular information track structure therein, the surface layer of said first-named substrate facing the surface layer of said second substrate and with a fixed spacing there-between.

* * * * *